United States Patent [19]

Hansen et al.

[11] Patent Number: 5,172,487
[45] Date of Patent: Dec. 22, 1992

[54] METHOD FOR CONTINUOUS DRYING OF A MATERIAL AND AN ASSEMBLY FOR CARRYING OUT SAID METHOD

[75] Inventors: Ole C. Hansen; Torben Andersen, both of Nakskov, Denmark

[73] Assignee: Danisco A/S, Copenhagen, Denmark

[21] Appl. No.: 582,202

[22] PCT Filed: Mar. 22, 1989

[86] PCT No.: PCT/DK89/00066

§ 371 Date: Sep. 24, 1990

§ 102(e) Date: Sep. 24, 1990

[87] PCT Pub. No.: WO89/09373

PCT Pub. Date: Oct. 5, 1989

[30] Foreign Application Priority Data

Mar. 23, 1988 [DK] Denmark .................... 1594/88

[51] Int. Cl.$^5$ ................................. F26B 5/06
[52] U.S. Cl. ............................... 34/5; 34/92; 34/15; 159/2.1; 203/88
[58] Field of Search ............ 34/5, 15, 17, 92; 159/2.1, DIG. 16; 203/88, 91; 127/58, 61

[56] References Cited

U.S. PATENT DOCUMENTS

| | | | |
|---|---|---|---|
| 1,161,603 | 11/1915 | Bradshaw | 34/15 |
| 1,250,496 | 12/1917 | Passburg | 34/15 |
| 3,206,866 | 9/1965 | McCabe | 34/15 |
| 3,234,661 | 2/1966 | Nerge | 34/5 |
| 3,266,169 | 8/1966 | Smith, Jr. | 34/5 |
| 3,303,578 | 2/1967 | Rockwell et al. | 34/5 |
| 3,396,475 | 8/1968 | Scheibel | 34/5 |
| 3,477,137 | 11/1969 | Van Gelder | 34/5 |
| 3,605,273 | 9/1971 | Andersen | 34/5 |
| 3,646,689 | 3/1972 | Kuchenthal et al. | 34/57 D |
| 3,698,098 | 10/1972 | Ramsay | 34/15 |
| 3,740,860 | 6/1973 | Smith, Jr. | 34/5 |
| 3,882,610 | 5/1975 | Bouldoires et al. | 34/5 |
| 4,229,886 | 10/1980 | Durant | 34/92 |
| 4,330,946 | 5/1982 | Courneya | 34/17 |
| 4,574,495 | 3/1986 | Brander | 34/15 |

FOREIGN PATENT DOCUMENTS

| | | |
|---|---|---|
| 0231584 | 8/1987 | European Pat. Off. |
| 2744099 | 4/1978 | Fed. Rep. of Germany |
| 342896 | 2/1972 | Sweden |
| 374811 | 3/1975 | Sweden |
| 1498119 | 1/1978 | United Kingdom |

Primary Examiner—Henry A. Bennet
Assistant Examiner—Denise Gomada
Attorney, Agent, or Firm—Oblon, Spivak, McClelland, Maier & Neustadt

[57] ABSTRACT

A method for the continuous drying of a material. The temperature of the material is adjusted to below the boiling point of the material at atmospheric pressure. The material is fed into a vacuum chamber and led through the vacuum chamber without a heat supply. Then the dried material is removed through an air lock. The method can be carried out by an assembly including a mechanism for adjusting the temperature of the material, a feeding mechanism for feeding the material into a vacuum chamber, a vacuum chamber, a mechanism for transporting the material through the vacuum chamber and an air lock. The method and assembly are useful for drying materials which are sensitive and/or difficult to solidify.

28 Claims, 4 Drawing Sheets

METHOD FOR CONTINUOUS DRYING OF A MATERIAL AND AN ASSEMBLY FOR CARRYING OUT SAID METHOD

TECHNICAL FIELD

The present invention relates to a method for drying of a substantially particle-free, syrup-like material and an assembly for carrying out said method.

BACKGROUND ART

It is often difficult to remove the remaining water when preparing products, such as sugars, sugar alcohols and similar sensitive as well as hygroscopic products in dry form, such as in powder form.

One of the reasons is the high content of compounds with hydrophilic groups in most of the above materials, rendering the products hygroscopic.

Another reason is the tendency of some of said materials to form supersaturated solutions, wherefrom it is difficult to precipitate and isolate solid products.

Supersaturated and other concentrated solutions are very often highly viscous. Consequently they are difficult to handle and have the tendency to stick to the apparatus.

All these properties further impede the removal of water, e.g. by evaporation or drying, since problems arise during the heating of the material. An equal distribution of heat is, for example, not ensured, thus risking local overheating. During the heating the material can be destroyed or deteriorate e.g. by burning, carmamelization, denaturation or another form of decomposition.

Several methods for drying products in order to remove the remaining water are known, such as spray drying, drum drying, freeze drying or flash drying.

For spray drying, the solution to be dried is fed into a chamber in the form of tiny drops. The falling drops are dried by means of hot air so that the drops are transformed into a dry powder before they reach the bottom of the chamber. Spray drying cannot be used if the solution has the tendency to remain liquid, either as an supersaturated solution or in form of a melt, during the drying process, where the temperature is usually about 60° C., since the material accumulates on the walls of the spray drying chamber.

Drum drying is normally performed at temperatures about 100° C. At this temperature many materials occur in form of a melt and thus they cannot be transformed into a solid product. During drum drying the product accumulates on the warm surfaces, causing overheating with subsequent destruction or deterioration of the material.

With conventional flash drying water is removed almost instantaneously from wet, solid particles, said particles being dispersed at high speed in a warm stream of gas. In flash drying the temperature of the drying air is above 100° C., rendering this drying method unsuitable for drying heat-sensitive products.

It is evident that neither spray drying, drum drying nor flash drying are suitable for the preparation of solid, dry products, such as some sugars and some sugar alcohols, other heat-sensitive products and/or those difficult to crystallize.

The only known methods suitable for drying such materials are freeze drying and microwave vacuum drying. These methods are, however, expensive, since their operational costs are high, especially with regard to energy consumption and capital costs.

The German Offenlegungsschrift No. 34 07 374 discloses a method for preparing dried products from sucrose syrup. According to this method the pre-concentrated sucrose syrup with a dry matter content of at least 70% is heated for a short period, such as below 60 sec, to a very high temperature, and the warm material is expanded to a concentrated syrup with a dry matter content of at least 90%. This syrup is transformed into a dry, pourable product by sudden cooling and subsequent release of the remaining water during crystallization.

This method is limited to easily crystallizable materials with a positive enthalpy of crystallization, i.e. materials crystallizing during cooling. The method is consequently unsuitable for amorphous products and other materials difficult to crystallize. Furthermore the material is subjected to high temperatures of about 135°–155° C., thus rendering the method unsuitable for heat-sensitive materials.

U.S. Pat. No. 1.250.496 discloses a process for drying grain and other coarse, granular materials, where the grain is heated and then subjected to first a low vacuum and thereafter a high vacuum. The process involves expensive equipment and the process cannot be used for drying particle-free, syrup-like materials.

U.S. Pat. No. 3.206.866 discloses a method and apparatus for dehydrating food employing geothermal steam. The food is fed into a vacuum chamber through an air lock and is transported through said chamber by means of several conveyor belts and is finally removed from the vacuum chamber through an air lock. The food is heated inside the vacuum chamber. The latter step renders this method unsuitable for dehydration of syrup-like materials since the material is locally overheated resulting in its deterioration.

U.S. Pat. No. 4.574.495 discloses a drying apparatus with a vacuum chamber, wherein the material to be dried is transported by means of conveyor belts. This apparatus is also equipped with means for supplying heat to the inside of the vacuum chamber. Therefore this apparatus also deteriorates a syrup-like material due to overheating.

Finally EP Patent Application No. 0.231.584 A1 discloses a drying apparatus including a screw conveyor. The apparatus is heated by means of a heating mantle. Therefore also this apparatus is unsuitable for drying heat-sensitive materials, such as syrup-like material.

Other patents, such as SE-PS No. 342.896, SE-PS NO. 374.811, U.S. Pat. No. 3.698.098 and U.S. Pat. No. 1.161.603, disclose various methods and apparatuses for drying materials, such as wood panels, protinaceous materials, heat-sensitive parachutes of synthetic fibres and colloid substances, respectively.

GB-PS No. 1.498.119 discloses a process for drying and expanding a past, which is extruded into a vacuum chamber. The temperature of the paste is between 60 and 125° C. This process is, however, unsuitable for drying a substantially particle-free, syrup-like material. The known process is difficult to control, if the extruder aperture has a diameter of less than 0.25 mm. In order to effect an adequate control of the process the aperture should be of a diameter of from 0.5 to 5 mm.

DE-OS No. 2.444.099 discloses a method for preparing dextrose powder in dry form containing a major amount of β-dextrose anhydride. This method, however, involves a grafted crystallization and is not usable in case on non-crystallizing materials, such as a mixture of oligosaccharides prepared according to the concurrent DK patent application No. 1592/88, filed Mar. 23, 1988.

P. E. Anderson and J. Risum (Introduktion til Levnedsmiddel-Teknologien, vol. 1, 3. edition, p. 333, 1982, Polyteknisk Forlag, Copenhagen) disclose a conventional flash evaporator. The evaporator is, however, only suitable for the preparation of concentrated, still liquid products.

DISCLOSURE OF THE INVENTION

The object of the present invention is to provide a method for removing the remaining water from heat-sensitive, hard or impossible to crystallize and/or hygroscopic materials by drying a solution or melt of a material with a high dry matter content. Said method avoids the above difficulties of the known methods and is less expensive than freeze drying and microwave vacuum drying.

The method according to the invention is characterized in that a) the temperature of the material is adjusted to a value below the boiling point of said material at atmospheric pressure, b) the material is fed into a vacuum chamber, c) the material is led through the vacuum chamber without any heat supply to the material, d) the dried material is removed from the vacuum chamber through an air lock.

The product obtained by the inventive method has a particular amorphous structure rendering it suitable to form agglomerates. Such agglomerates are advantageous because they are very easily admixed with other materials. Compared to crystalline products they have a better flow-ability due to their smaller surface, a smaller amount of dust and display a lesser tendency to absorb humidity from the atmosphere. Furthermore it is possible to obtain agglomerate products having a high bulk density.

Furthermore solid and non-tacky materials having a dry matter content of only 95% by weight can be prepared by the inventive method.

The starting material of the inventive method is a material concentrated by means of conventional methods, e.g. evaporation. The degree of concentration depends on the material, since the danger of destruction or deterioration, energy consumption and rheologic properties of the concentrate have to be taken into consideration.

The inventive method normally removes 2%-9% by weight of water based on the feed. This is, for example, used for drying an oligosaccharide with a dry matter content of 91%-95% by weight into a powder with a dry matter content of 95%-99% by weight.

The inventive method is suitable for drying a mixture of oligosaccharides with a general formula $GF_n$, wherein G is glucose, F is fructose and n is an integer, said mixture being further described in the concurrent patent application DK Patent Application No. 1592/88 and comprising 10%-20% weight of G+F+GF, 10%-20% by weight of $GF_2$, 8%-15% by weight of $GF_3$ and 72%-45% by weight of $GF_4$ and above.

This mixture is obtained from plant tubers or roots, especially the tubers of the Jerusalem artichoke, Helianthus tuberosus L. or roots chicory, Cichorium, using a conventional plate for treating sugar beets to prepare a syrup of a dry matter content of 65%-80% by weight.

This syrup is further evaporated by means of a suitable evaporator, such as a falling film evaporator, a vertical vacuum dryer and a thin film evaporator, to a dry matter content of 91%-95% by weight before it is subjected to the inventive method. The material is removed from the evaporator at a temperature of 80°-100° C. It is necessary to maintain this temperature, since otherwise the material turns viscous and thus accumulates on the walls of the evaporator, resulting in an interruption of its operation and destruction of the product.

For the inventive method the temperature of the material is adjusted to a value below its boiling point. The enthalpy of the material is such that no heat supply is necessary during the subsequent steps (b, c and d).

The material is then fed into a vacuum chamber, preferably by distributing it corresponding to a thin layer, in drop-from, or in any other way ensuring a large surface of the material.

The vacuum chamber is connected to a vacuum pump or the like to establish a suitable vacuum.

When the material has entered the vacuum chamber the boiling point of the material is lower than the temperature of the material at the pressure in the vacuum chamber, causing a spontaneous evaporation of water. The heat of evaporation of water is taken from the material resulting in a corresponding drop in temperature. It is thus unnecessary to supply external heat. Supplying external heat during evaporation would cause undesired local overheating. In the present case and external supply is avoided thus simplifying the process and reducing the cost of the equipment. Furthermore, the material is hot while it has the highest water content.

During the evaporation of water in a vacuum chamber the material is cooled down to a temperature slightly above the temperature where the vapor pressure of water corresponds to the absolute pressure in the vacuum chamber. The vapor pressure of water at 22, 25, 30, 35 and 38° C. is 19.8, 23.8, 31.8, 42.2 and 49.7 mmHg respectively. When the vacuum chamber has an absolute pressure of 23.8 mmHg the product leaves the vacuum chamber due to boiling point elevation with a temperature of approx. 27°-30° C., while an absolute pressure of 42.2 mmHg results in a temperature of 37°-40° C.

The dry and cold product is removed from the vacuum chamber through an air lock, e.g. a cell air lock, ensuring a continuous running of the assembly.

This method of drying is just as gentle as freeze drying, but considerably less expensive. The case of the above mixture on the basis of tubers of Jerusalem artichokes, described in the concurrent Danish Patent Application No. 1592/88, the energy costs for concentrating the material from a dry matter content of 66% by weight to 98%-99% by weight are 0.80 DKK/kg when freeze-drying is used. In comparison the total energy costs for concentrating the same material in three steps comprising the inventive method, i.e. from 66% by weight to 85% by weight in a falling film evaporator, from 85% by weight to 92% by weight by means of batch evaporation in a vertical vacuum dryer and from 92% by weight to 98%-99% by weight according to the inventive method are only 0.11 DKK/kg.

When drying a syrup of a dry matter content of 91%-95% by weight, the temperature of the syrup is adjusted to 80°-100° C., preferably 90°-100° C. This is advantageously achieved by maintaining the temperature of the syrup leaving the pre-evaporation step.

The absolute pressure in the vacuum chamber is kept at 10-60 mmHg, preferably 20-50 mmHg. The material is carried through the chamber by a means of transport or by free falling and leaves the vacuum chamber through an air lock, optionally subsequent to grinding. The powder obtained in this manner is of a dry matter content of 95%-99% by weight and its temperature has dropped to 25°-40° C.

For setting a suitable duration of time in the chamber the velocity of the means of transport is preferably adjustable or controllable. The basis for such a control is e.g., the dry matter content of the finished product, the temperature of the product when leaving the air lock or other values.

For the method to be carried out in a suitable and reliable manner the following data has to be in a matching, dynamic balance:

composition of the starting material, incl. its water content,
flow rate of the starting material,
temperature of the starting material,
pressure in the vacuum chamber,
transport velocity through the chamber and
temperature and dry matter content of the finished product when leaving the vacuum chamber.

In order to ensure such a dynamic balance the method according to the invention is preferably characterized in that a) the temperature of the material is adjusted to a temperature less than 30° C. below the boiling point of the material, preferably less than 10° C. below the boiling point, b) the material is fed into a vacuum chamber having an absolute pressure of 10-60 mmHg, c) the material is led through the vacuum chamber by a means of transport, d) the dried material is removed from the vacuum chamber through an air lock, optionally subsequent to a preceding gross grinding.

In order to obtain a suitable flow of the material through the vacuum chamber, the velocity of the means of transport is advantageously adjustable.

In an alternative, preferred embodiment also ensuring the above dynamic balance a) the temperature of the material is adjusted to a temperature less than 30° C. below the boiling point of the material, preferably less than 10° C. below the boiling point, b) the material is fed into a vacuum chamber having an absolute pressure of 10-60 mmHg, c) the material is led through the vacuum chamber by a means of free fall, d) the dried material is removed from the vacuum chamber through an air lock, optionally subsequent to a preceding gross grinding.

For obtaining a suitable dry matter content of the powder the material fed into the vacuum chamber is advantageously of a dry matter content of 91%-95%.

The inventive method is especially suitable for drying of materials, such as syrups comprising carbohydrates; syrups containing sugar alcohol; honey; fruit juices and vegetable juices. Accordingly the method is potentially suitable for drying e.g. invert syrup, isosyrup (high fructose syrup, HFCS), enriched high fructose syrup (EFCS) and glucose syrup; sorbitol and xylitol; vegetable and fruit juices, such as carrot juice, tomato juice or apple juice; and the above mixture of saccharides mentioned in the concurrent DK Patent Application No. 1592/88.

Examples of the composition of the above HFCS and EFCS are:

| HFCS: | 42% by weight of fructose |
| | 5% by weight of higher sugars |
| | 53% by weight of glucose |
| EFCS: | 55% by weight of fructose |
| | 5% by weight of higher sugars |
| | 40% by weight of glucose |

For ensuring a substantially complete and fast evaporation of water, the means of transport is advantageously a conveyor belt and the material is distributed on the conveyor belt in an amount corresponding to a layer with a thickness of 1-10 mm, preferably 2-5 mm. Such a layer is, however, never formed in practice, since the material foams up immediately upon entering the vacuum chamber.

Excellent transport characteristics are alternatively achieved by employing a screw conveyor. The screw conveyor is preferably a self-cleaning twin screw to prevent the accumulation of material on the screw. A suitable fast transportation rate of the material through the vacuum chamber is obtained by employing several screws, for example 2-6 and preferably -5, said screws being parallel and adjacent each other.

When 2 or more screws are used they can rotate in the same or an opposite direction, insofar as righthand as well as lefthanded screws may be used.

According to the invention the method can be carried out by means of an assembly characterized in that it comprises a means for adjusting the temperature of the material to a value below the boiling point of the material at atmospheric pressure, a feeding means for feeding the material into a vacuum chamber, a vacuum chamber, a means of transport for carrying the material through the vacuum chamber, and an air lock. In one embodiment of the inventive assembly the means of transport is a conveyor belt made of e.g. steel, plastic, rubber or other suitable material.

The feeding material is provided with a device for distributing the material by means of extrusion on the conveyor as a layer, preferably corresponding to a thickness of 1-10 mm, more preferred 2-5 mm. As mentioned this layer is only formed theoretically, in practice the material immediately foams up. During transport through the vacuum chamber the material thus foams up, as the water evaporates fast, causing an immediate drop in temperature. At the end of the conveyor belt a knife or scraper scrapes the dried material off the conveyor belt, whereupon its falls into a screw conveyor.

The screw conveyor—also under vacuum—crushes the product and transports it to an air lock, such as a cell air lock, wherefrom the dried product is continuously removed in the form of a powder. The crushing also ensures that the product is able to pass through the air lock.

In an alternative embodiment of the inventive assembly the means of transport is formed like a screw conveyor, e.g. a twin-screw conveyor. In this embodiment the material is fed onto the screw through an extruder or by spraying it through a nozzle, and carried towards the output side by the screw. The material is distributed corresponding to a thin layer on the surface of the screw, said layer instantaneously foaming up by the sudden evaporation of water. The resulting foam is crushed and ground by the screw in such a way as to enable the dried product to fall into a hopper at the output side to be removed through an air lock, preferably a cell air lock.

If the product is very stick, as is the case of many syrups, the screw is advantageously a self-cleaning screw. A self-cleaning twin screw includes two screws, one of them rotating twice as fast as and having a pitch half a large as the other one. The self-cleaning screw is provided with a self-cleaning rounded section so that the two screws clean each other. Usually there is a gap of 3 mm between the two screws, for especially fine processing, however, the self-cleaning twin screw can be manufactured with a gap of as small as about 1 mm.

In both embodiments the amount of material to be fed and the velocity or speed of the belt or screw are determined in such a way that the layer theoretically formed on the belt or screw is sufficiently thin.

It is thus advantageous to render the velocity or speed of the belt or screw adjustable or controllable.

In a further embodiment of the invention the means for carrying the material through the vacuum chamber is provided by free fall. This assembly is especially suitable for drying sticky materials difficult to remove from the means of transport. This embodiment constitutes a simple and inexpensive alternative to the self-cleaning screw.

An assembly according to this embodiment suitably comprises a means for adjusting the temperature of the material to a value below the boiling point of the material at atmospheric pressure; a feeding means for feeding the material through apertures into the top of the vacuum chamber; a vacuum chamber provided for free fall; a hopper at the bottom of the vacuum chamber for collecting the dried material; and a beater situated inside the hopper and an air lock.

In a simple form of an assembly according to this invention the air lock is a ball valve. In all above embodiments the feeding means is preferably provided with several apertures or one or more narrow gaps or slots, the most narrow dimension of said apertures, gaps or slots being not more than 2 mm, preferably not more than 1 mm, most preferably not more than 0.25 mm. The narrow dimension ensures a good distribution of the material throughout the vacuum chamber as well as a short drying period.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The invention is explained below in greater detail and with reference to the accompanying drawings, in which.

BEST MODE FOR CARRYING OUT THE INVENTION

Figure 1:
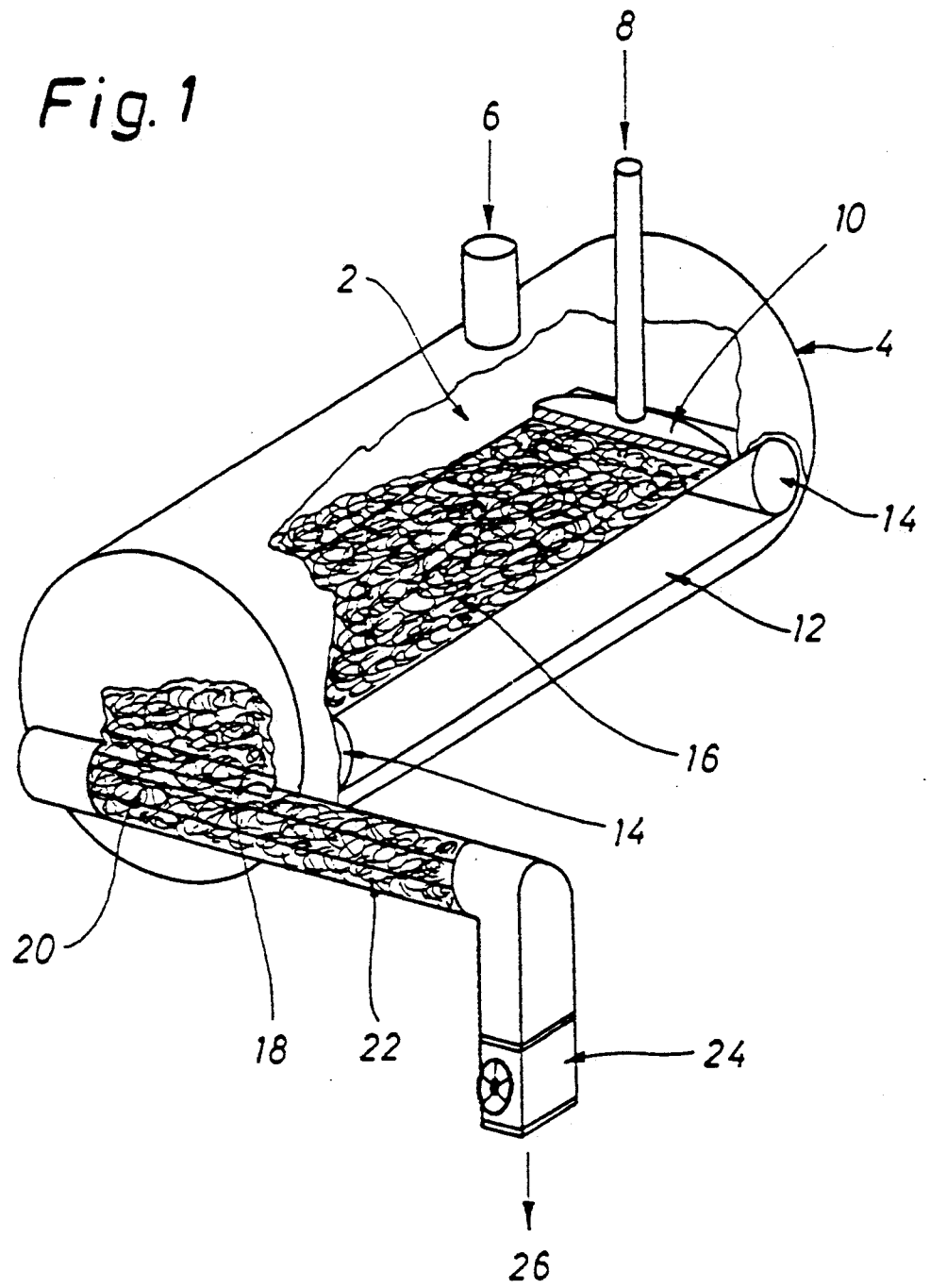
FIG. 1 shows a first embodiment of the inventive assembly, where the means of transport is a conveyor belt.

FIG. 1 illustrates a vacuum chamber 2 inside a housing 4. To resist the external pressure the housing 4 has the shape of a cylinder with convex ends. The vacuum chamber 2 is connected to a vacuum source (not shown) via a connection piece 6 and corresponding channels (not shown). The vacuum pump is preferably a water ring vacuum pump. Between the vacuum pump and the vacuum chamber a condenser can be installed, where the steam from the vacuum chamber condensates. The installation of a condenser increases the efficiency of the vacuum pump. The material to be dried is fed into a channel 8 connected to a distributing piece 10. The distributing piece 10 can be provided with several small apertures or one or more small gaps or slots, said apertures, gaps or slots optionally being of varying length or width. The distributing piece distributes the material in a uniform amount across the entire width of the distributing piece.

A conveyor belt 12 runs on two rolls 14 with an adjustable speed. The distributing piece 10 distributes the material over one end of the conveyor belt 12. By choosing a suitable adjustment of the feeding rate through the channel 8 and the distributing piece 10 and of the velocity of the conveyor belt 12 the material is distributed across the width of the conveyor belt 12 in an amount corresponding to a uniform, thin layer. During the transport though the vacuum chamber 2 water evaporates from the material 16 and the material foams up. When it has reached the opposite end of the conveyor belt 12 the material has been converted into a dry and solid product and is scraped off by a scraper 18. The scraped-off product falls into a screw 20 in a chamber 22. The chamber 22 is connected to the vacuum chamber 2 and is thus also exposed to vacuum.

The screw 20 transports the product to a cell air lock 24, simultaneously crushing and grinding said product. The finished product 26 is removed through the air lock 24.

Figure 2:
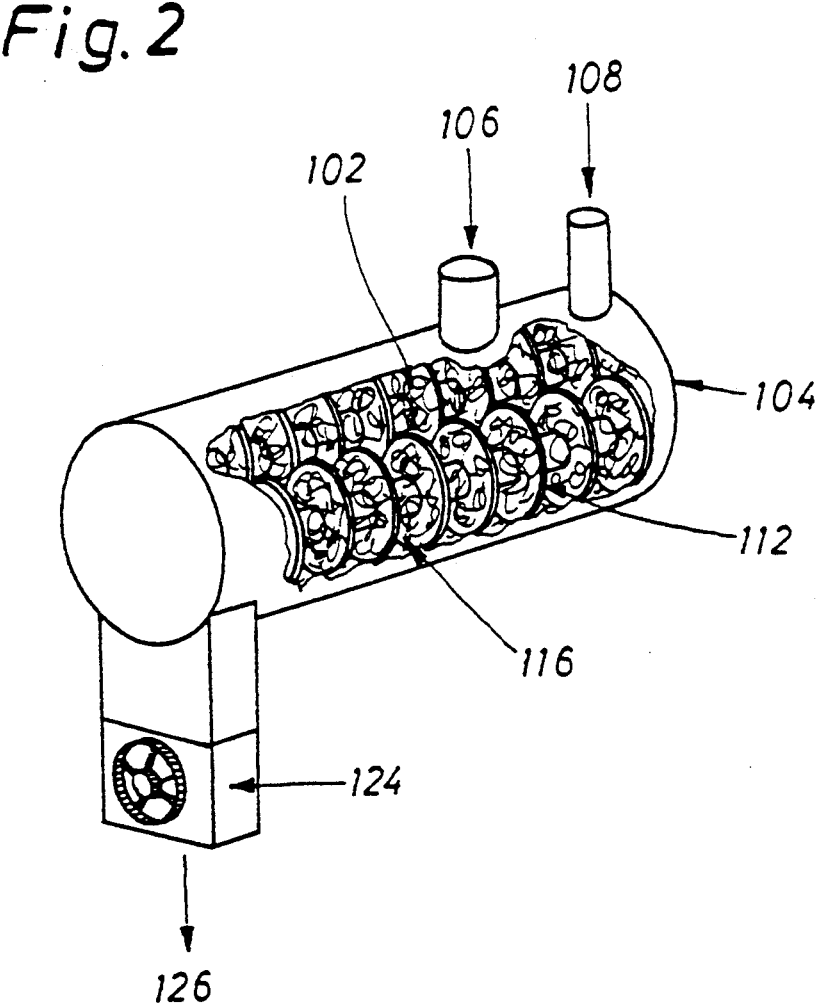
FIG. 2 shows another embodiment of the inventive assembly where the means of transport is a twin-screw conveyor.

FIG. 2 shows an alternative embodiment of the inventive assembly. A vacuum chamber 102 is inside a housing 104 of cylindrical shape with convex ends as in the embodiment of FIG. 1. The vacuum chamber 102 is connected to a vacuum source via a connection piece 106 and channels (not shown). The material is fed through a channel 108 directly to the input end of a speed-adjustable twin screw 112. The material feeding rate through the channel 108 and the speed of the twin screw 112 is adjustable as to allow the material to be distributed corresponding to a thin and uniform layer on the surface of the twin screw 112. During transport through the vacuum chamber 102 water evaporates from the material 116 and the material foams up. Simultaneously, the twin screw crushes and grinds the material. As a result, the material reaches the output end of the twin screw as a dry, pulverized product. The product falls directly into a cell air lock 124, optionally by employing an internal funnel. The finished product 126 is removed through the air lock 124.

Figure 4:
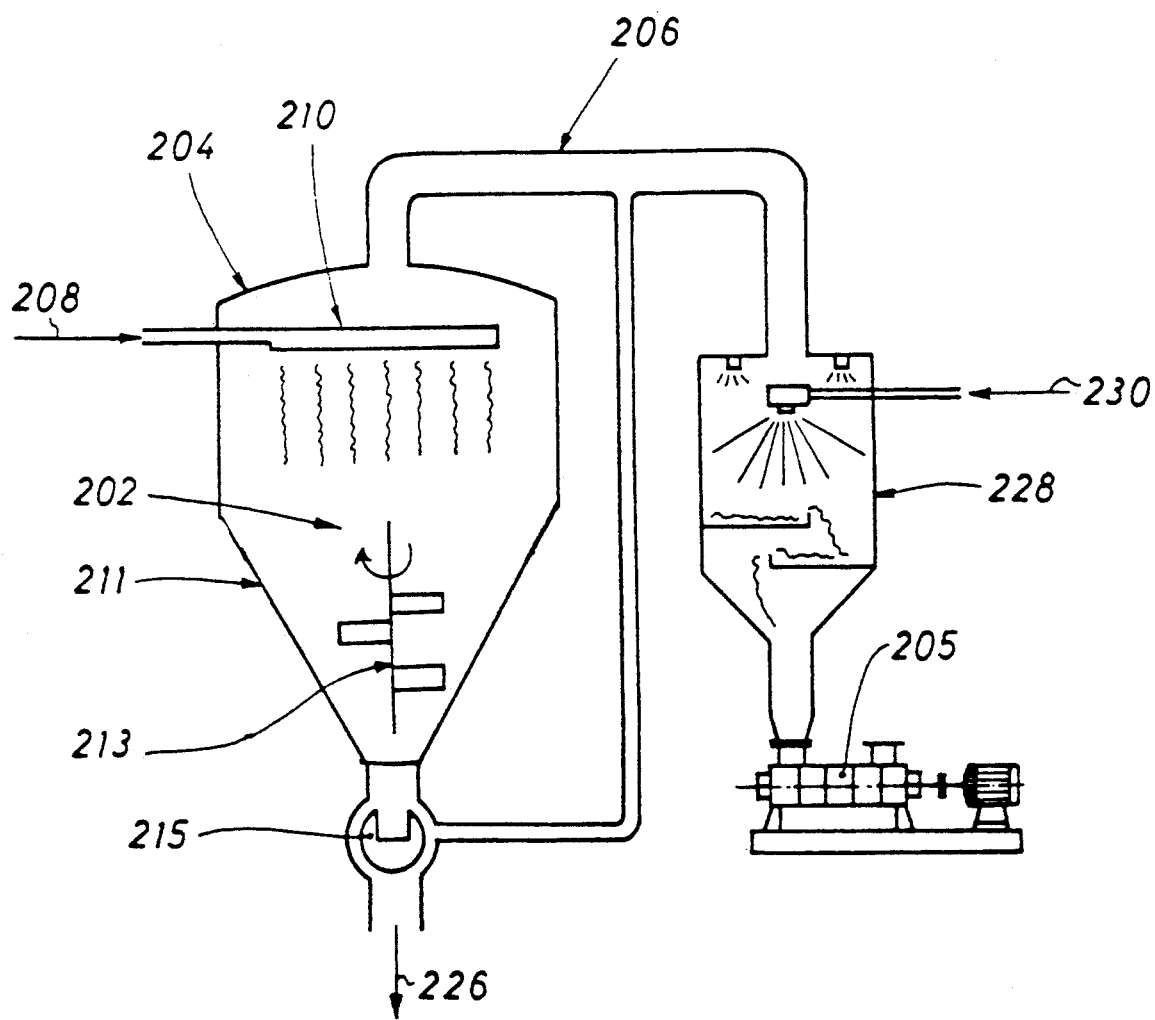
FIG. 4 shows a third embodiment of the inventive assembly using free fall as a means of transport.

FIG. 4 shows an alternative embodiment of the inventive assembly. A vacuum chamber 202 inside a housing is connected to a vacuum pump 205 via a connection piece 206. The material is fed to a distributing piece 210 via a channel 208. The distributing piece 210 has one or more small apertures for instance having a diameter of 1 mm. The dried material falls into a hopper 211, wherein a beater 213 disintegrates the dried material. The disintegration allows the removal of the material through a ball valve 215. When the ball valve is filled it is turned 180° and the finished product 226 is removed. The ball valve 215 is provided with a suction conduit to the vacuum pump 205 ensuring that no air leaks into the vacuum chamber when returning the ball valve 215. Between the vacuum pump 205 and the vacuum chamber 202 a condenser 228 is installed, said condenser being fed with cooling water 230. The steam from the vacuum chamber is condensated in the condenser 228 thus increasing the efficiency of the vacuum pump.

The invention is described below in greater detail by means of the following examples. Example 1 describes the preparation of the starting material, while Examples 2-10 describe the inventive method.

EXAMPLE 1: PREPARATION OF A SYRUP

The harvested tubers of the Jerusalem artichoke are treated on a conventional plant for treating sugar beets. The treatment includes the following steps.

1. Feeding and Removal of Stones and Grass

The tubers are emptied into a beet yard and flow into the plant, while stones as well as green plant material (i.e. grass and stem material) are removed. Most of the soil is also washed off.

2. Cutting

For preparing the tubers for to the subsequent extraction process said tubers are cut into cosettes with a cross-section of approx. 0.5×0.5 cm. Their length depends on the size of the tubers (typically 2-5 cm). The cutting process is performed on a conventional sugar beet cutter. It can, however, be necessary to use other knives.

3. Extraction

In order to extract the desired product from the cosettes, the extraction process is performed analogous to the one known from the extraction of sugar from sugar beets. The extraction is performed in a so-called DDS-diffusor, a trough with a steam mantle. The tough has a small inclination and is provided with a twin screw ensuring transport of the cosettes.

The cosettes are extracted according to the counterflow principle, i.e. the cosettes are fed through a funnel in the bottom part of the trough. Water as well as the press juice obtained in step 4 are fed into the top part of the trough.

The cosettes are then transported counter to the flow of water, whereby oligosaccharides and other water-soluble components, such as salts and proteins, pass into the water phase.

The temperature during the extraction is between 60°-85° C. Such a high temperature ensures not only good solubility of oligosaccharides but also partially denaturates the protein as to render it insoluble. Enzymes are also denatured and thus inactivated at this temperature.

The dry matter content of the extract is 10%-17% by weight.

4. Pressing of the Pulp

The extracted cosettes are pressed in a special press of the type also used for conventional sugar beet processing. This is done to increase both the yield of oligosaccharides as well as the dry matter content of the pulp. The pulp has often to be dried with regard to stability during transport and storage until use, e.g. in form of foodstuffs. The increase in yield is achieved by transferring the press juice back to the extraction process, as described above.

5. Purification of the Juice

The juice obtained by the extraction process is turbid since it contains particulate and colloidal material. Among the impurities present are pectin and proteins as well as cell material from the cosettes.

In order to remove these impurities slaked lime, $Ca(OH)_2$ is added up to a pH of 10.5-11.5, thereby precipitating a part of the impurities.

The pH-value is lowered again by adding $CO_2$ or phosphoric acid either before or after filtration. Thus excess calcium is precipitated either as calcium carbonate or calcium phosphate. The pH-value after this treatment is between 8.0 and 9.5. The juice is subsequently filtered. The temperature during the lime treatment is 35°-40° C., and during the lowering of the pH-value and the filtering it is 60°-80° C. Precipitation and filtering are improved at the higher temperature.

The purification of the juice is performed using the same equipment as in conventional sugar beet processing.

After the purification the dry matter content is 9%-16% by weight.

6. Ion Exchange

After purification the juice still contains salts (3%-8% by weight of the total dry matter) and it is brownish or greenish in colour. It is thus subjected to a cation as well as an anion exchange.

The cation exchange (e.g. on a "Duolite®"-C20 resin) is performed at a temperature of 25°-35° C. in order to avoid hydrolysis of the oligosaccharides.

During the anion exchange (e.g. on a "Duolite®" A-378 resin) the colored compounds of the juice are also removed as to render said juice a colorless oligosaccharide solution. The dry matter content after the ion exchange is 8%-14%.

7. Treatment with Active Carbon

It may be necessary to treat the ion-exchanged juice with active carbon in order to remove possible residues of colored compounds, undesired taste or odoriferous compounds.

8. Evaporation

Before the actual evaporation it is advantageous to employ hyperfiltration (reverse osmosis) in order to remove part of the water so that the dry matter content is up to approx. 25% by weight. By this step a more gentle treatment is obtained.

The evaporation is performed in a multi-step evaporator such as a falling film evaporator. The juice is evaporated to a syrup of a dry matter content of between 75%-85% by weight.

Thereafter the syrup is evaporated in a vertical vacuum dryer or a thin film evaporator to a dry matter content of 90%-96% by weight, preferably 91%-93% by weight.

EXAMPLE 2

VACUUM FLASH DRYING

A syrup having a dry matter content of 91%-93% by weight obtained according to the method of Example 1 and being of a temperature of 80°-100° C. is transferred to a vacuum chamber provided with a conveyor belt.

By adjusting the dry matter content and the temperature of the feeding material as well as the vacuum in the chamber the obtained product has a temperature of 30°-40° C. after evaporation of water and is solid. The heat of evaporation is derived from the enthalpy of the feeding material, i.e. it is not necessary to add heat during the drying process.

At an absolute pressure of 23.8 of 42.4 mmHg the product leaving the vacuum chamber has a temperature of approx. 30° C. or approx. 40° C. respectively.

The process can be described as a flash-like evaporation in vacuum, the feed being a syrup and the final product a dry powder.

The above process differs from conventional flash evaporation by being performed in a vacuum, thus rendering it unnecessary to overheat the feeding material, and by the feeding material being a solution and not a wet, particulate matter.

An interesting property of this drying method is the fact that the product is cooled to a desired final temperature of typically 30°-40° C. during the drying/water evaporation.

EXAMPLE 3

The general procedure described in Example 2 is carried out in a vacuum chamber provided with a self-cleaning twin screw. In this manner a final dry powder product similar to the product obtained in Example 2 is obtained.

EXAMPLE 4

A syrup having a dry matter content of 91% by weight and a temperature of 95° C. obtained according to Example 1 is fed into a vacuum chamber provided with a conveyor belt. The absolute pressure in the vacuum chamber is 25 mm Hg. The dry powder leaving the chamber has a dry matter content of 96% by weight and a temperature of 31° C.

EXAMPLE 5

A syrup having a dry matter content of 93% by weight and a temperature of 95° C. obtained according to Example 1 is fed into a vacuum chamber provided with a conveyor belt. The absolute pressure in the vacuum camber is 39 mm Hg. The dry powder leaving the chamber has a dry matter content of 98% by weight and a temperature of 39° C.

EXAMPLE 6

A syrup having a dry matter content of 92% by weight and a temperature of 85° C. obtained according to Example 1 is fed into a vacuum chamber provided with a conveyor belt. The absolute pressure in the vacuum chamber is 30 mm Hg. The dry powder leaving the chamber has a dry matter content of 95.8% by weight and a temperature of 35° C.

EXAMPLE 7

A syrup having a dry matter content of 91% by weight and a temperature of 99° C. obtained according to Example 1 is fed into a vacuum chamber provided with a self-cleaning twin screw. The absolute pressure in the vacuum chamber is 30 mm Hg. The dry powder leaving the chamber has a dry matter content of 96.5% by weight and a temperature of 35° C.

EXAMPLE 8: DRYING OF GLUCOSE SYRUP

The starting material is a commercial available glucose syrup with a dry matter content of 80% by weight. The syrup is pre-evaporated by means of batch evaporation for 2 h in a vertical vacuum dryer to a dry matter content of 92.5% by weight. During the evaporation the syrup has a temperature of 85° C. and the vacuum is 80% (absolute pressure about 150 mm Hg). After the batch evaporation the temperature is elevated to 95° C. and the syrup is extruded into a vacuum flash dryer, as shown in FIG. 1. The gap of the extruder has a width of 0.5 mm. In the vacuum flash dryer the absolute pressure is 24 mm Hg.

After leaving the extruder the syrup foams up momentarily to a thickness of 5-6 cm. After a sojourn time of 1½ min the dried syrup leaves the vacuum flash dryer at a temperature of 35° C. in form of a rough granulate with a dry matter content of 97.5% by weight.

Figure 3:
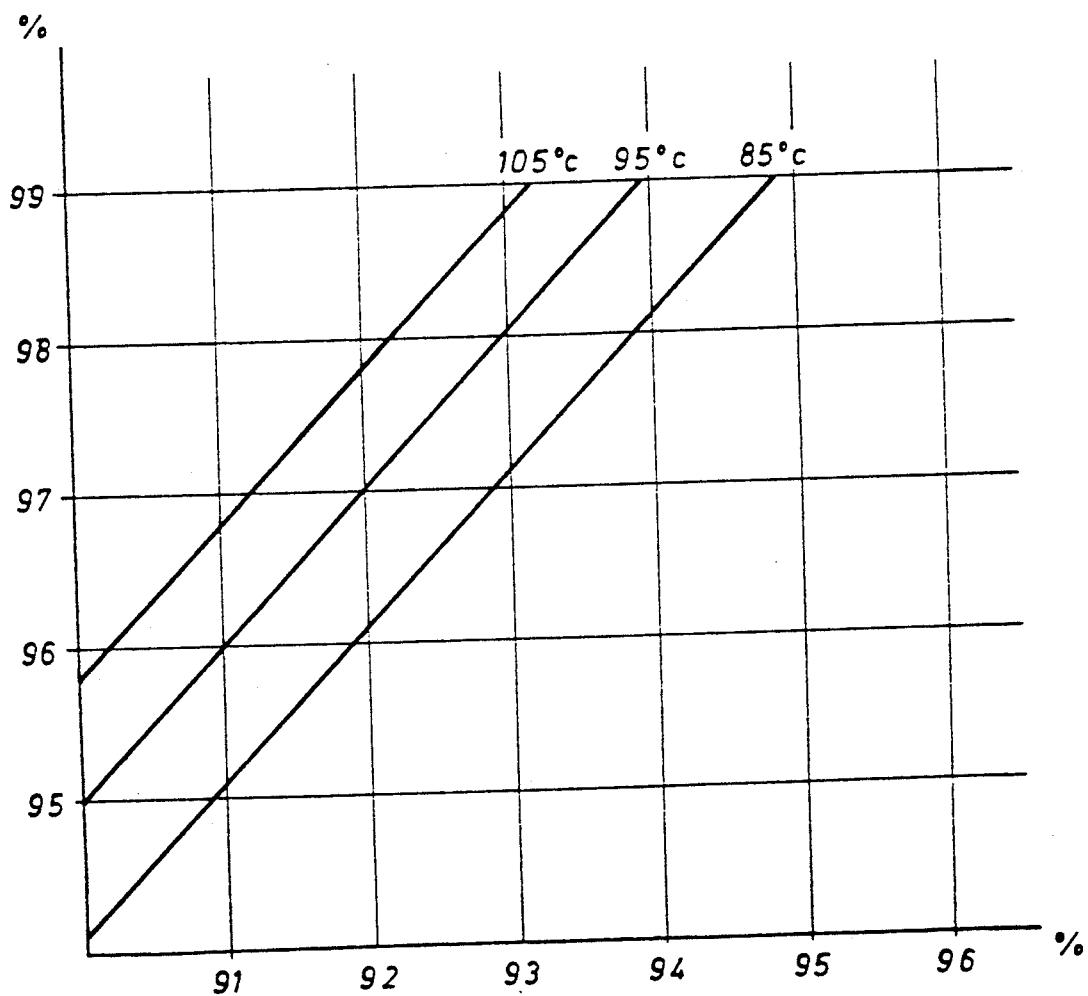
FIG. 3 shows the relation between the dry matter content of the starting material and the material leaving the assembly and the temperature by means of the inventive method when flash drying glucose syrup as described in Example 8.

FIG. 3 is a diagram illustrating the possibilities of altering the dry matter content and the temperature of the input material and still end up with the same final product. In FIG. 3 the abscissa represents % by weight of the dry matter content in the input material and the ordinate represents the dry matter content in % by weight of the material leaving the assembly.

EXAMPLE 9

A mixture comprising 80% by weight of glucose syrup having a dry matter content of 80% by weight and 20% by weight of concentrated apple juice having a dry matter content of 67% by weight is evaporated in a vertical vacuum dryer to a dry matter content of 92.5% by weight. After evaporation the temperature is adjusted to 97° C. and the material is extruded through nozzles having a diameter of 1 mm into a vacuum flash dryer with free fall as shown in FIG. 4. In the vacuum flash dryer the absolute pressure is 10 mm Hg. The dry powder leaving the vacuum flash dryer has a dry matter content of 96.3% by weight and a temperature of about 34° C.

EXAMPLE 10

In a vertical vacuum dryer cane sugar molasses having a dry matter content of 80% by weight is evaporated to a dry matter content of 93% by weight, whereupon the temperature of the material is adjusted to 96° C. The molasses is extruded into the vacuum flash dryer of Example 9, the absolute pressure in said dryer being 14 mm Hg. A dry amorphous powder leaving the vacuum flash dryer has a dry matter content of 96.3% by weight and a temperature of about 32° C.

This example demonstrates the possibility of obtaining an amorphous powder instead of the crystalline form obtained by conventional methods.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A method for the continuous drying of a material, which comprises:
    a) adjusting the temperature of the material to a value which is not injurious for the material;
    b) feeding the material into a vacuum chamber,
    c) moving the material through the vacuum chamber without heat being supplied to the material so as to dry the material after introduction into the vacuum chamber; and
    d) removing the dried material from the vacuum chamber through an air lock,
    e) wherein said material comprises a substantially particle free syrup selected from the group consisting of syrups of carbohydrate and syrups of sugar alcohol and wherein step a) comprises adjusting the temperature of the syrup to a value below the boiling point of the material at atmospheric pressure but sufficiently high of the material to be dried in step c) to an amorphous, solid product such that a phase shift of said material occurs from a liquid state to a solid state.

2. A method as in claim 1, which comprises
    adjusting the temperature of the material in step a) to a temperature less than 30° C. below the boiling point of the material,
    feeding the material in step b) into the vacuum chamber having an absolute pressure of between 10 and 60 mmHg,
    moving the material of step c) through the vacuum chamber by transport means, and
    gross grinding the dried material before it is removed from the vacuum chamber through an air lock in step d).

3. A method as in claim 2, which comprises adjusting the velocity at which the material is moved through the vacuum chamber by the transport means.

4. A method as in claim 1, which comprises
    adjusting the temperature of the material in step a) to a temperature less than 30° C. below the boiling point of the material,
    feeding the material in step b) into the vacuum chamber having an absolute pressure of 10-60 mmHg,
    moving the material in step c) through the vacuum chamber by free falling, and
    gross grinding the dried material before removing the dried material from the vacuum chamber through an air lock in step d).

5. A method as in claim 1, wherein the material fed into the vacuum chamber comprises material of a dry matter content of 91%-95% by weight.

6. A method as in claim 2, wherein the transport means comprises a conveyor belt and the material on the conveyor belt is distributed so as to form a layer with the thickness of 1-10 mm.

7. A method as in claim 2, wherein moving the material comprises moving the material by a screw conveyor.

8. A method as in claim 2, wherein moving the material comprises moving the material by a self-cleaning twin screw conveyor.

9. A method as in claim 2, wherein moving the material comprises moving the material by a screw conveyor having from 2-6 screws parallel and adjacent to each other.

10. Assembly for continuous drying of a material, which comprises:
    means for adjusting the temperature of the material to a value below the boiling point of the material at atmospheric pressure but sufficiently high to be dried to an amorphous solid product;
    a vacuum chamber;
    feeding means for feeding the material into the vacuum chamber;
    means for leading the material through the vacuum chamber without heat being supplied to the material so as to dry the material after introduction into the vacuum chamber,
    an air lock; and
    means for removing said material from the vacuum chamber to said air lock wherein said means for adjusting the temperature of the material comprises means for adjusting the temperature of the material to a value below the boiling point of the material at atmospheric pressure but sufficiently high for the material to be dried in the vacuum chamber to an amorphous, solid product such that a phase shift of said material occurs from a liquid state to a solid state.

11. As assembly as in claim 10, wherein the means for leading the material through the vacuum chamber comprises means for causing the material to free fall in the vacuum chamber.

12. An assembly as claimed in claim 11, wherein said means for adjusting the temperature of the material comprises means for adjusting the temperature of the material to a value below the boiling point of the material at atmospheric pressure; the chamber has at least one aperture formed therein, said feeding means comprises means for feeding the material through the apertures of the chamber into a top portion of the chamber, said chamber being dimensioned so as to provide for free fall of the material in the chamber; and wherein a hopper is positioned at the bottom of the chamber for collecting the dried material, a beater is situated inside the hopper and an air lock is connected to said hopper.

13. An assembly as in claim 10, wherein the air lock comprises a ball valve.

14. An assembly as in claim 10, wherein the feeding means includes a plurality of apertures formed therein, the most narrow dimension thereof being not more than 2 mm.

15. An assembly as in claim 10, wherein the feeding means includes a plurality of apertures formed therein, the most narrow dimension thereof being not more than 1 mm.

16. An assembly as in claim 10, wherein the feeding means includes a plurality of apertures formed therein, the most narrow dimension thereof being not more than 0.25 mm.

17. An assembly as in claim 10, wherein the means for leading the material through the chamber comprises transport means.

18. An assembly as in claim 17, wherein the transport means includes means for adjusting the velocity of the material led through the chamber.

19. An assembly as in claim 17, wherein the transport means comprises a conveyor belt, the feeding means comprises a device for distributing the material so as to form a layer on the conveyor belt, and the assembly comprises a scraper for scraping the material after being dried off the conveyor belt and a screw conveyor for grinding the scraped off material and transporting the scraped off material into the air lock.

20. An assembly as in claim 17, wherein the transport means comprises a conveyor belt made of one of steel, plastic and rubber.

21. An assembly as in claim 17, wherein the transport means comprises a screw conveyor.

22. An assembly as in claim 17, wherein the transport means comprises a self-cleaning twin screw conveyor.

23. An assembly as in claim 17, wherein the transport means comprises a screw conveyor having from 2-6 screws which are parallel and adjacent to each other.

24. An assembly as in claim 2, which comprises adjusting the temperature of the material in step a) to a temperature less than about 10° C. below the boiling point of the material.

25. A method as claimed in claim 4, which comprises means for adjusting the temperature of the material in step a) to a temperature less than 10° C. below the boiling point of the material.

26. A method as claimed in claim 6, which comprises distributing the material on the conveyor belt so as to form a layer with a thickness of 2-5 mm.

27. A method as claimed in claim 9, wherein moving the material comprises moving the material by a screw conveying using 2-5 screws.

28. An assembly as claimed in claim 23, wherein the means of transport comprises a screw conveyor having 2-5 screws.

* * * * *